Hayford & Paul,
Preserving Wood.
No. 95,583. Patented Oct. 5, 1869.

Witnesses
Edward Piffett
Geo. A. Long

Hayford and Paul
by their Attorney
Frederick Curtis

United States Patent Office.

IRA HAYFORD AND JOSEPH F. PAUL, OF BOSTON, MASSACHUSETTS.

Letters Patent No. 95,583, dated October 5, 1869.

IMPROVED PROCESS OF TREATING WOOD, TO PRESERVE, SEASON, AND GIVE IT A BETTER SURFACE.

The Schedule referred to in these Letters Patent and making part of the same.

To all to whom these presents shall come:

Be it known that we, IRA HAYFORD and JOSEPH F. PAUL, of Boston, in the county of Suffolk, and State of Massachusetts, have made an invention of a new and useful Process or Mode of Treating Wood for various purposes; and do hereby declare the following to be a full, clear, and exact description thereof, due reference being had to the accompanying drawings, making part of this specification, and in which—

Figure 1:
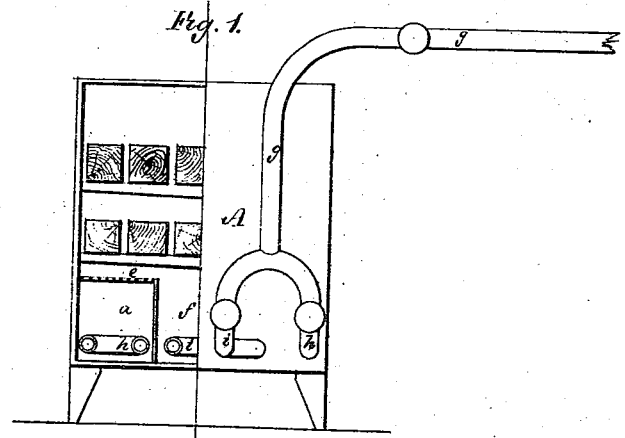

Figure 1 is a vertical and transverse section, and

Figure 2:
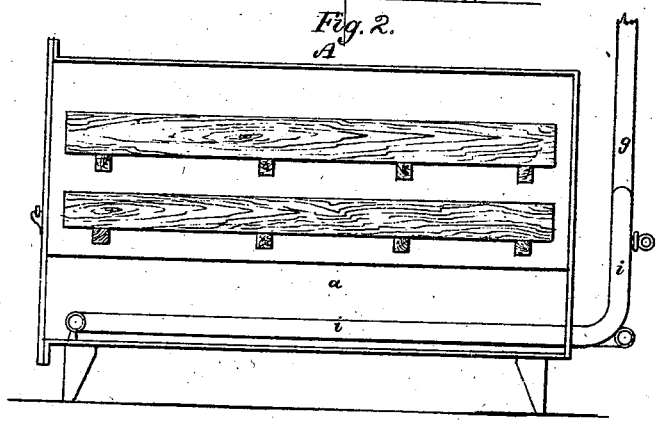
Figure 3:

Figure 2, a vertical and longitudinal section of an apparatus or still employed for carrying out our process, Figure 3 being a horizontal section of the same, taken through the paraffine and water-chambers of the apparatus, to be hereinafter explained.

The invention herein described, and which constitutes the subject matter of this patent, consists in an improved process or mode of treating wood, and although wood treated by this process is susceptible of various uses, it is intended more especially for manufacture of butter and lard-firkins or boxes, water-pails, &c., the process to which the wood is subjected being intended rather to effect the removal of its inherent tainted properties or moisture, and supply their place with a tasteless and comparatively odorless substance, which shall not only protect the wood against changes in the temperature of the atmosphere, and render it proof against penetration by liquid or oleaginous substances, than to arrest and postpone its decay for a great length of time, although this latter result is obtained, in some degree, by our process.

Produce-dealers and house-keepers, as well as pail and tub-manufacturers, have long felt the need of some effective means of removing the taint of various kinds of wood, since a very large quantity of butter and lard, as well as other kindred substances, become more or less impregnated and contaminated, and in many cases spoiled, by absorbing the tainted and disagreeable moisture or gases from the wood of the vessel in which they are packed.

Another important object sought has been to render the wood impervious to the penetration by, and escape of lard, &c., the loss from this source alone, in large establishments, being a matter of great moment.

Our present invention is intended to deodorize wood to a greater or less extent, according to its nature, to render it proof against penetration by liquid and oleaginous substances, and to insure it against changes in its condition from the effect of varying temperatures, as well as to retard its decay, another object of the invention being to render wood fire-proof, and, for some uses, to increase its specific gravity and density.

The substance we employ to render this wood comparatively odorless and tasteless, as well as impervious to moisture or oleaginous substances, by injection into its pores and tissues, is paraffine or palm-oil, while the substance we adopt to render it fire-proof is carbonate of ammonia, or an analogous chemical agent, while to increase its hardness or density, and when desirable its specific gravity, we combine with the paraffine and carbonate of ammonia, a quantity of silicate of sodium, or in place of it, powdered soapstone, an additional effect or advantage of either of these last two being, that they aid in imparting a brilliant polish to the surface of wood.

We are aware of the existence of numerous patented inventions, both in this country and Europe, for the preservation of wood by expelling the moisture and albumen from its pores, and replacing them by injecting or carrying into such pores various liquids or oleaginous substances, which have the effect of arresting for a great length of time the natural decay of wood.

Among the many processes heretofore adopted, has been that of permeating the pores and tissues and cellular structure of wood by the vapors of evaporation, water, and fatty or oleaginous substances, the watery vapors expanding the pores and cells, as well as expelling moisture and gases therefrom, the oleaginous matters following the escape and supplying the place of the moisture, &c.

In carrying out this mode of impregnation of wood, various devices have been adopted by different inventors, and our apparatus will be found to add to this number, since its basis is the penetration of the pores of the wood by oleaginous vapors, mingled with or held in suspension by steam, which becomes the vehicle for conveying these vapors into said pores.

So far, then, our process of impregnation of wood with foreign substances, may be said to follow in the steps of our predecessors, but in the peculiar application of materials employed, and in the effects produced, as well as in local and characteristic details of apparatus, our invention will be seen to possess several points of novelty and usefulness not found in previous inventions of its class.

The principal object sought in the various processes of treating wood have been to preserve it from decay for the various purposes of building bridges, wharves, navigable vessels, &c., while our invention, on the contrary, was originated for an entirely different purpose, as it is found in practice that the various agents used in these processes had the effect of tainting and discoloring the wood, our invention, on the contrary, having the effect of deodorizing it, and discoloring it to very little if any extent, while it adds in a very marked degree to the richness of its color, which is important in the manufacture of furniture.

We are aware that vessels for containing lard and other oleaginous food, have been dipped in melted paraffine, the object being to deposit an impervious coating on the surfaces of the wood. This, however, very imperfectly accomplishes the object sought, since the coating of paraffine soon wears off.

In carrying out our invention, we produce a strong generator or structure, A, of wrought-iron or other material, capable of resisting any internal pressure of thirty pounds to the square inch, the interior of this structure at once serving the double purpose of a generator and a treating-chamber for the preparation of wood.

The substances within the structure or chamber A, may be evaporated by heat, applied directly to the under surface and walls of such structure, but for various reasons we prefer to evaporate its contents by steam, admitted in a suitable manner, or with suitable pipes, to its interior.

Within the chamber A, and upon or near the floor, we create two side enclosures, $a\ b$, formed by erecting partitions $c\ d$, lengthwise of the structure, and covering the area between such partitions and the walls of the structure, with foraminous plates $e\ e$, or their equivalents, the enclosures or tanks $f\ a\ b$, thus produced, being for reception of the paraffine or palm-oil, as well as the fire-proof and hardening substances, when employed in the process, and also the water from which vapors are produced.

A steam-pipe, $g$, is conducted from an ordinary generator into close proximity to the exterior of the structure A, where it is divided, one branch, or that marked $a$ in the accompanying drawings, being carried in a serpentine or irregular direction throughout the two water-tanks or generators $a\ b$, and returned to the outside of the structure, while the other branch, or that marked $i$, is made to course throughout the area of the paraffine-tank $f$, the extremity of this latter pipe also being carried to the outside of the structure.

This simple arrangement of parts constitutes the apparatus employed by us in carrying out our process.

The wood to be treated is placed within the chamber A, and upon suitable racks or supports, after the manner of other devices for the purpose. The water-tanks $a$ and $b$ are then to be partially filled with water, and the central tank $f$ supplied with a proper quantity of paraffine or palm-oil, the fire-proof and hardening materials being also added, if desirable, when steam is to be admitted into the branch pipes $g$ and $h$ before mentioned, until the contents of the several tanks are vaporized, and the wood thoroughly saturated with the resulting vapors, when the steam pressing through the said pipes is to be shut off, the evaporation within the chamber A being stopped.

The vapors resulting from the evaporation of the water, and from the liquefication and ensuing evaporation of the paraffine and filling the chamber A, circulate about all parts of the wood contained therein.

As before observed, these vapors fill and expand the pores and tissues of the wood, coagulate the albumen therein, and drive therefrom the tainted moisture and gases, or any and all impure or injurious substances, the resulting condensation, evaporation, and escape of the vapors within and from the pores, allowing the paraffine held in suspension to deposit itself in a thin film upon the interior surface of the said pores, and about the tissues.

The watery particles of the vapors then fall to the bottom of the tanks $a$, $b$, and $f$, while the paraffine in excess of the amount first entering the pores of the wood, settles itself over the surface of the water, and by preventing escape of moisture therefrom, produces a dry and warm atmosphere within the chamber A, which soon completes the desiccation of the wood.

The fire-proof and hardening substances before referred to, are also taken in suspension and deposited within the pores and about the tissues of the wood with the results before stated.

One object in placing the wood in the treating-chamber A, previous to heating the water and paraffine is, that by gradually raising the temperature of said chamber, we obviate the checking and cracking of the wood, which often takes place upon subjecting it suddenly to the action of hot vapors.

Large sums of money have heretofore been expended, and many and elaborate experiments conducted, in the attempt to preserve wood in such manner that lard shall not escape through its pores and tissues, the amount of loss from this source being much greater than uninformed persons are aware of.

The paraffine or palm-oil, not only, as before stated, protects wood from changes in temperature or climate, but renders it impervious to liquid or oleaginous substances, and deodorizes or otherwise produces such effect upon it, that no injurious taste or odor is imparted to the lard or other food, by contact with it. The natural decay of wood is also retarded to a great extent.

We are aware, as before stated, that the pores of wood have been saturated with steam to expel their impurities, and liquid or oleaginous substance in a cold state allowed to condense this steam, and to subsequently enter and fill the pores of the wood.

This mode required a liquid substance, and all the liquid substances heretofore used to preserve wood possess in a greater or less degree injurious odors and tastes, consequently for the purpose for which our invention was originated, they would be valueless. Under this mode, also, the preserving-agents entered and entirely filled the pores of the wood.

Should paraffin be employed in treating wood in such quantities as to fill the pores, as would be the case in other processes, it might be justly urged that the expense would render its adoption non-feasible.

By filling the pores of wood with the combined vapors of water and paraffine, as in our invention, and then checking the evaporation, we gain a very important advantage, since the amount of paraffine thus held in solution or suspension, is not sufficient to fill the pores, but merely deposits a thin film upon their inner circumference, and about the tissues and fibres of the wood.

As an evidence of the economy of our use of paraffine, we would state that we are daily treating large quantities of wood, at an expense not exceeding that demanded for other modes of treatment.

For purposes of furniture-making, the color of wood treated by our process is rendered very much deeper and richer, and as this color extends entirely through it, moisture or wear will not remove it, as is the case in the ordinary mode of polishing.

The silicate of soda, while increasing the weight of the wood, by increasing its density, adds very much to the facilities for polishing it.

Claims.

We claim—

1. Treating wood by impregnating and filling its pores and tissues with the combined vapors of paraffine or palm-oil and water, and then checking the evaporation of such materials, the result being the depositing of a thin film within and about the pores and tissues of the wood.

2. In combination with a material for preserving wood by injection into its pores, the use of silicate of soda, and of carbonate of ammonia, for the purpose before stated.

IRA HAYFORD.
JOSEPH F. PAUL.

Witnesses:
FRED. CURTIS,
EDWARD GRIFFITH.